No. 855,371. PATENTED MAY 28, 1907.
C. H. WHITE & A. S. MacKAY.
MILK COOLER AND AERATOR.
APPLICATION FILED MAY 21, 1906.
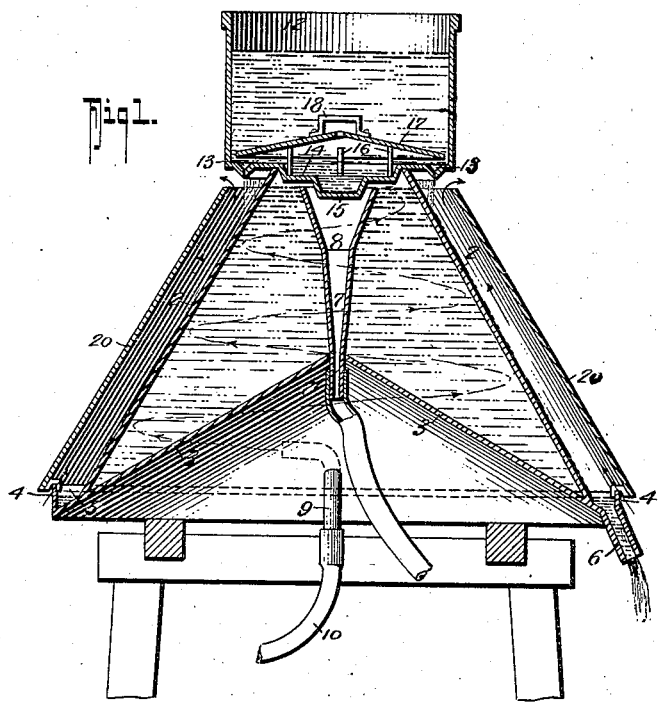
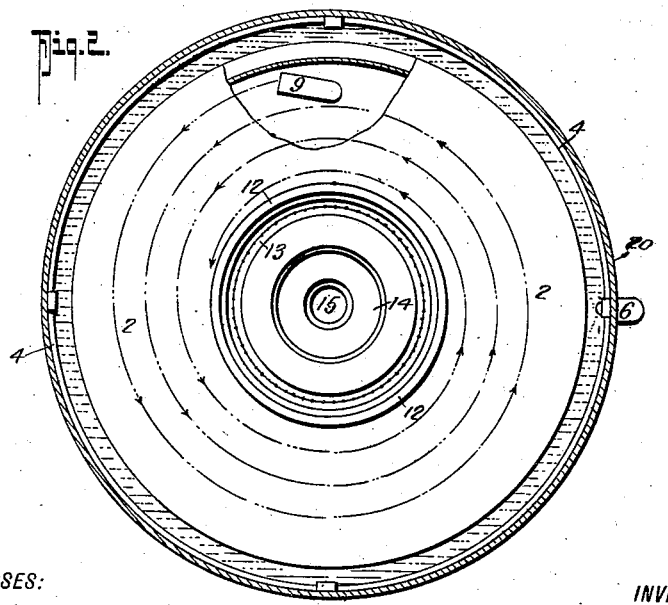
WITNESSES:
John T. Schrott
F. C. Gibson
INVENTORS
CHARLES H. WHITE,
ALEXANDER S. MACKAY.
BY
Fred G. Dieterich
ATTORNEY

UNITED STATES PATENT OFFICE.

CHARLES H. WHITE AND ALEXANDER S. MacKAY, OF VANCOUVER, BRITISH COLUMBIA, CANADA.

MILK COOLER AND AERATOR.

No. 855,371.    Specification of Letters Patent.    Patented May 28, 1907.

Application filed May 21, 1906. Serial No. 318,074.

*To all whom it may concern:*

Be it known that we, CHARLES H. WHITE and ALEXANDER S. MACKAY, citizens of the Dominion of Canada, residing at the city of Vancouver, in the Province of British Columbia, Canada, have invented a new and uesful Improvement in Milk Coolers and Aerators, of which the following is a specification.

This invention relates to a milk cooler and aerator of that class wherein a finely divided stream of milk is permitted to fall upon and run down the outside of a conical cooling vessel within which cold water is circulated, and our effort has been to improve the means whereby dust or other impurities which are unavoidably present in milk as it is delivered by the milkers, is separated therefrom, and further in the manner of introducing and withdrawing the water to and from the cooling vessel whereby a circulation suited to the requirements is attained.

There are also several minor novel features of construction which conduce to more effective work, to which attention is drawn in the following specification and which are illustrated in the drawings by which it is accompanied; Figure 1 being a vertical section through the cooler, and Fig. 2 a plan of the same and part section showing the position and direction of discharge of the water inlet, the baffle of the milk vessel and cover of the cooler being removed.

The cooler consists of a conical vessel the outer shell 2 of which is open at the top and has a flattened conical bottom 3. The outer edge of the bottom 3 projects beyond the lower edge of the outer shell and is furnished with an upwardly projecting rim 4 forming an annular channel 5 which receives the milk as it flows down the outside of the cone and delivers it to the milk outlet spout 6.

Projecting through the bottom 3 close to its junction with the outer shell 2 is the water delivery pipe 9 having a hose connection 10 from a tank or water service. The inner end of this pipe 9 is turned toward the outer shell 2 and delivers at an angle (see Fig. 2) inclined toward the circumference in a horizontal plane or at a slight upward incline. Down the center of the vessel from a position just below the top rim of the shell 2 and projecting through the conical bottom 3 to permit of the attachment of a hose connection, is the water overflow pipe 7, preferably tapered as shown and having a flared or funnel shaped upper end 8.

The conical bottom of the cooler is a strong form and reduces the volume of water within the vessel and the outward and circumferentially directed angle of the water inlet is designed to cause the incoming water to flow upward in a helix round the inner side of the conical shell 2 under the combined influence of the force of the inflow and the speficic levity of the water as its temperature rises owing to the abstraction of heat from the flow of milk over the outside of the cone. This circular flow of the water causes the colder and specifically heavier water to be thrown in contact with the outer wall 2 while the warmer water being lighter will tend toward the vortex of the outlet. The warmest portion of the water when it reaches the top flows over the flared mouth 8 of the outlet pipe 7 and is carried away by the hose connection, and the enlargement of the overflow outlet toward the reduced diameter of the upper end of the cooling vessel restricts the area from which the overflow is withdrawn and insures that only the warmest water passes away.

Resting on the open end of the cooler and projecting concentrically over it is the milk receiving vessel 12 in the bottom of which a short distance within the outer edge as shown in Fig. 1, is a slight annular depression 13 provided with fine perforations, and within the seat which rests on the open end of the cooler shell 2 is a further slight depression 14 having at its center a deeper depression 15 which projects within the flared upper end 8 of the water overflow of the cooler and forms a pocket in which will collect sediment or other impurities which will not pass through the fine apertures of the outflow ring.

Resting within the milk receiving vessel 12 on legs or supports 16 is a removable baffle 17 upwardly convex or dished as a flattened cone as shown, and of such a size as to leave a uniform annular space between its outer edge and the inside of the vessel. In the center of this is an air vent which is shielded by the handle 18. The object of this baffle is to prevent disturbance of settled impurities in the depressions 14 and 15 and to distribute the flow of the milk to the outer edge of the perforated annular depression 13 so that the milk shall flow over the apertures and form an eddy toward the sediment collecting depressions 14 and 15.

In this construction of the cooler the conical wall is such that the milk will fall upon and be distributed in a finely spread sheet over the outer surface whereby ample aeration and efficient deodorization are attained. To protect this finely divided film of milk from dust and to cause a current of air to flow upward over it, a removable conical casing 20 may be used resting on the rim 4 of the milk channel 5 and extending upward to a short distance below the top rim of the shell 2. A current of air will thus by the heat of the milk be induced to flow as indicated by the arrows, the purer air being toward the base of the cone where the milk leaves the cooler.

Having now particularly described our invention, what we claim as new and desire to be protected in by Letters Patent, is:

1. In a milk cooler, the combination with a conical cooling vessel having an annular channel at the base and a delivery spout therefrom, of a circumferentially directed water inlet toward the bottom, a central overflow toward the top, and a receiving vessel held over said cooling vessel with its bottom forming a closure for the inside thereof and projecting over the outside thereof, said receiving vessel having outlets in its bottom for discharging the milk on the outer surface of the conical vessel, and a removable baffle within said receiving vessel, substantially as shown.

2. In a milk cooler; the combination with a conical cooling vessel having an inwardly projected base and an annular channel surrounding the same, of a circumferentially directed water inlet within the vessel toward its base, an overflow down the center having a flared mouth at the upper end, an outer conical casing surrounding the outer conical side of the cooling vessel, said casing resting on the rim of the base channel of the vessel so as to leave an annular space for the ingress of air and a similar outlet at the top and means for distributing milk over the outer surface of the cooling vessel.

3. In a milk cooler having a conical cooling vessel; a milk receiving vessel resting on the open upper end of the cooling vessel the bottom of said milk receiving vessel having an annular perforated depression outside of its seat upon the cooling vessel, a depression within such seat which depression deepens toward the center, an upwardly convex or conical baffle supported above the bottom of the cooling vessel which baffle extends beyond the perforated annular depression in the bottom of the vessel.

4. In a milk cooler, the combination with a conical cooling vessel, having a conical bottom and open at the top, and having an annular channel at the base and a delivery spout therefrom, of a circumferentially directed water inlet toward the bottom of said cooling vessel, a central overflow toward the top of said cooling vessel, a receiving vessel having a bottom to form a closure for the top of said cooling vessel, said receiving vessel bottom projecting over said cooling vessel top and provided with an annular depression having perforations for discharging the milk onto the outer surface of the cooling vessel in a spray, and a removable baffle within said receiving vessel, substantially as shown and described.

5. In a milk cooler, the combination with a conical cooling vessel, having a conical bottom and open at the top, and having an annular channel at the base and a delivery spout therefrom, of a circumferentially directed water inlet toward the bottom of said cooling vessel, a central overflow toward the top of said cooling vessel, a receiving vessel having a bottom to form a closure for the top of said cooling vessel, said receiving vessel bottom projecting over said cooling vessel top and provided with an annular depression having perforations for discharging the milk onto the outer surface of the cooling vessel in a spray, and a removable baffle within said receiving vessel, substantially as shown and described.

6. In a milk cooler, the combination with a conical cooling vessel, having a conical bottom and open at the top, and having an annular channel at the base and a delivery spout therefrom, of a circumferentially directed water inlet toward the bottom of said cooling vessel, a central overflow toward the top of said cooling vessel, a receiving vessel having a bottom to form a closure for the top of said cooling vessel, said receiving vessel bottom projecting over said cooling vessel top and provided with an annular depression having perforations for discharging the milk onto the outer surface of the cooling vessel in a spray, a baffle within said receiving vessel, and a conical casing held over said cooling vessel and spaced therefrom at the bottom and top to permit air admission at the bottom and air discharge at the top, substantially as shown and described.

In testimony whereof we have signed our names to this specification in the presence of two subscribing witnesses.

CHARLES H. WHITE.
ALEXANDER S. MacKAY.

Witnesses:
ROWLAND BRITTAIN,
ELLICE WEBBER.